(12) United States Patent
Kittle

(10) Patent No.: US 6,929,423 B2
(45) Date of Patent: Aug. 16, 2005

(54) GAS RECOVERY FROM LANDFILLS USING AQUEOUS FOAM

(76) Inventor: Paul A. Kittle, P.O. Box 707, Concordville, PA (US) 19331

( * ) Notice: Subject to any disclaimer, the term of this patent is extended or adjusted under 35 U.S.C. 154(b) by 20 days.

(21) Appl. No.: 10/753,793

(22) Filed: Jan. 8, 2004

(65) Prior Publication Data
US 2004/0143991 A1 Jul. 29, 2004

Related U.S. Application Data
(60) Provisional application No. 60/440,487, filed on Jan. 16, 2003.

(51) Int. Cl.[7] ............................................. B09B 1/00
(52) U.S. Cl. ........................... 405/129.95; 405/129.25
(58) Field of Search ................... 405/129.95, 129.25, 405/129.57

(56) References Cited

U.S. PATENT DOCUMENTS 3,599,715 A * 8/1971 Roszelle ................... 166/270.1
6,283,676 B1    9/2001 Hater et al.
6,481,929 B1    11/2002 Layton et al.

OTHER PUBLICATIONS

American City & County, 2003 Marketing Information, Oxidation system stops landfill methane odors, Apr. 1, 1998.

* cited by examiner

Primary Examiner—John Kreck
(74) Attorney, Agent, or Firm—Howson and Howson

(57) ABSTRACT

Gas is recovered from a landfill by introducing water into the landfill to promote digestion of organic matter in the landfill, and removing from the landfill gas produced by digestion. The improvement comprises the introduction of water as part of an aqueous foam, whereby the water is distributed more uniformly throughout the landfill. Iron salts may be included in the foam to eliminate hydrogen sulfide.

19 Claims, 2 Drawing Sheets

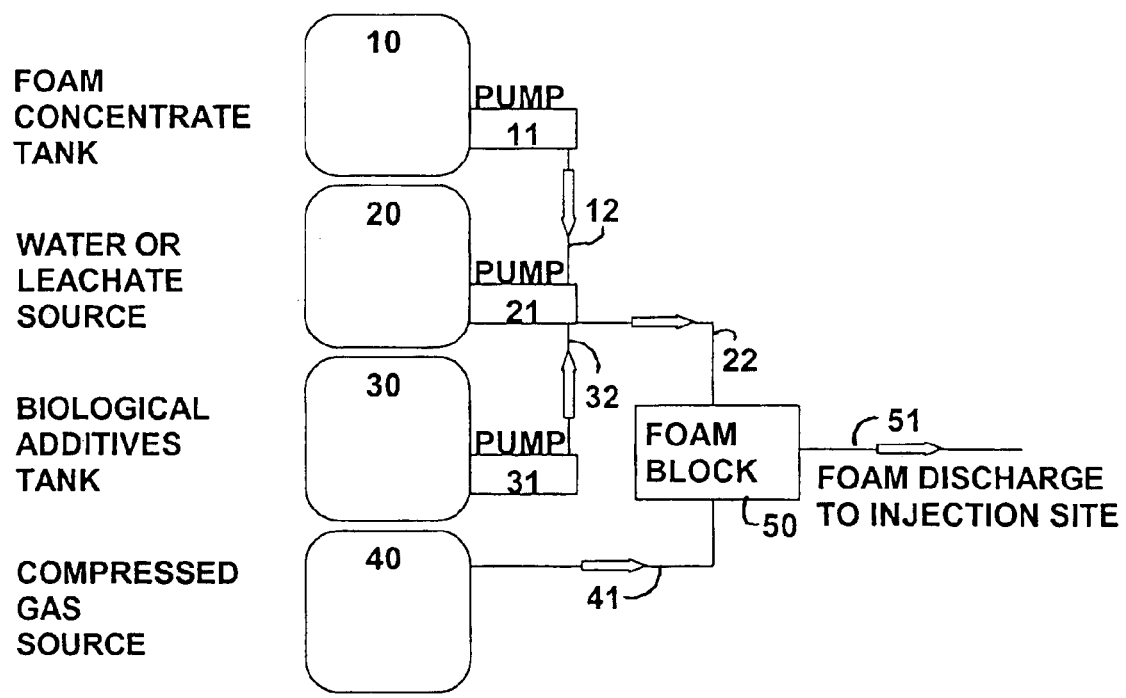
FIGURE 1-

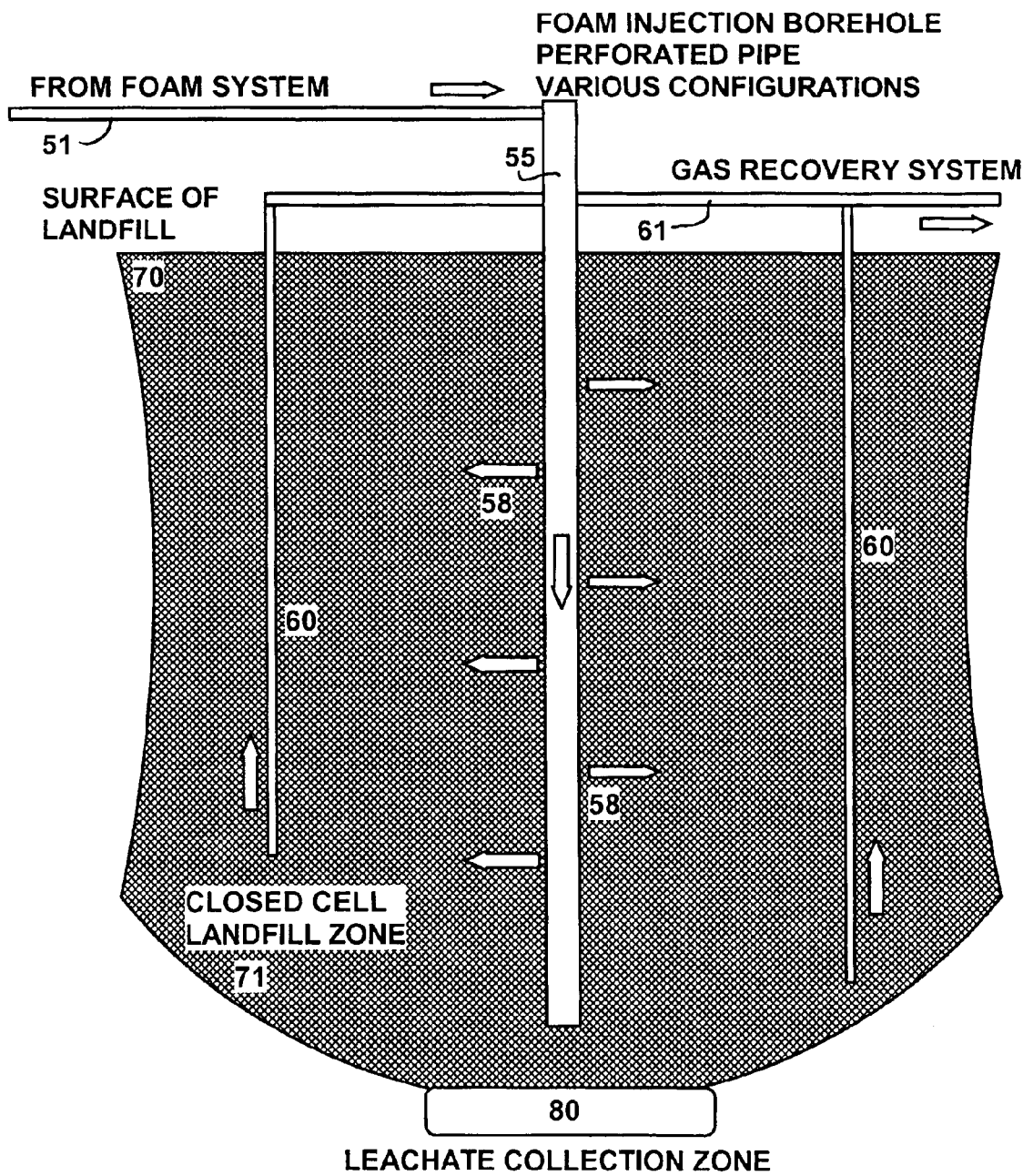
FIGURE 2 -

GAS RECOVERY FROM LANDFILLS USING AQUEOUS FOAM

CROSS-REFERENCE TO RELATED APPLICATION

This application claims priority from U.S. provisional patent application No. 60/440,487, filed Jan. 16, 2003.

FIELD OF THE INVENTION

This invention relates generally to the recovery of gas from landfills, and more particularly to a process for improving gas recovery in which aqueous foams are utilized, chemical formulations required for foam production, equipment for foam production, and equipment for injection of the foam into the landfill substrate.

BACKGROUND OF THE INVENTION

In the United States and most of the developed world, environmental regulations require sanitary landfills to recover landfill gas (methane) in order to minimize emissions. The recovered landfill gas is generally well purified and transported as pipeline gas, or modestly purified and burned on-site to produce electrical energy via an engine-driven generator or a relatively small gas turbine. The rules and regulations allow the pipeline gas or electricity to enter the appropriate utility distribution channel, thereby providing some compensation to the owners of the landfill and the operators of the landfill gas collection, purification, and generation processes. Even though a useful product, pipeline gas or electrical power, is produced by this recovery process, the concept is regarded as an environmental control, rather than a primary source of energy production.

Landfills are characteristically odorous facilities as the incoming trash is odorous. However, placing the incoming trash in the landfill and covering it with soil does not eliminate the odor; it only minimizes the odor. The real problem with respect to odor is water, which allows aerobic and/or anaerobic decomposition of the landfilled trash, thereby adding to the odor problems. Most importantly, during anaerobic decomposition, sulfate salts such as gypsum from discarded wall board in the landfilled trash, can produce hydrogen sulfide, a particularly odorous material. If more water is present, additional odorous substances are produced. Therefore, general operating procedures encourage minimization of water contact in the trash in order to minimize the overall odor problems at the landfill. Landfills over the past twenty five years have been operated as dry as possible, even though the incoming trash may contain 25 weight percent water.

When a landfill cell is completed (i.e., filled) the contained trash is a large loaf-like mass completely wrapped in a plastic barrier and entombed in many feet of soil. The base of the loaf-like mass includes a leachate collection system used to collect any liquid draining from the contents, while the outer surface prevents entry of moisture from the environment. Despite these measures, the encapsulated trash is still quite wet, perhaps 15 weight percent water on average. Once the cell closure is completed, the internal chemistry starts to operate, producing landfill gas and leading eventually to methane production. Initially the oxygen in the system is consumed via oxidation of the trash, thereby producing carbon dioxide and water, represented approximately as:

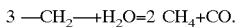

The gas that is produced is evacuated by the gas collection system and the liquid water is evacuated via the leachate collection system.

When all the oxygen has been consumed, the internal chemistry becomes anaerobic, thereby producing a chemically reduced gas instead of a chemically oxidized gas, represented approximately as:

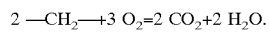

The important feature is that the hydrogen in the methane gas is derived from the reduction of water, so, as the availability of water decreases, the methane production decreases, eventually reaching a production level so low that recovery is uneconomic. Since the amount of reducible carbon remaining in the landfill, in general, far exceeds the amount of available and usable water, the entire chemical sequence stops before the maximum methane has been produced, or the maximum conversion of carbon has been achieved.

This observation is not revolutionary, as landfill engineers have known of the water availability limitation for many years. In fact, common practice now includes reapplication of leachate to the top surfaces of the loaf-like mass as a procedure for maintaining the water balance, thereby extending the methane production cycle, and, at the same time, consuming leachate. This technique does improve the overall methane yield, but the majority of the added water simply drains through the compacted trash, following the path of least resistance, becoming leachate once again, with a small percentage undergoing reduction to produce methane. A side benefit of leachate recirculation is that the impurities in the leachate are slowly removed, thereby alleviating the final disposal problem.

A process for maintaining proper moisture content throughout the loaf-like mass would allow optimized methane production, a reduction in the volume of the compacted trash as it would be consumed producing methane, consumption of leachate, the likely water source, and recovery of the landfill air space for reuse, perhaps following landfill mining, a technique used to restore landfill air space by excavation and separation of the contents, yielding soil-like material (compost) and non-biodegradable materials which may be recycled (steel, for instance).

Techniques are currently being developed to overcome these liquid water flow property weaknesses. Waste Management, Inc. has designed a landfill cell configuration incorporating an array of horizontal, perforated pipes used for the injection of water and air, and the extraction of the landfill gases. The Waste Management, Inc. landfill is described in Hater et al., U.S. Pat. No. 6,283,676. Hater et al. U.S. Pat. No. 6,283,676 contains an excellent review of past technology directed at increasing the methane production, and is incorporated by reference in its entirety.

The main objective of this developing technology is air space recovery, and the technique allows degradation to start early-in the cell filling process. The initial phase of treatment involves cell hydration using either leachate and/or fresh water, followed by air injection to initiate composting, which generates heat, thereby warming the entire landfill mass. The initial hydration process essentially floods the landfill mass in order to assure maximum hydration. This procedure, of course, requires large volumes of liquid, as the landfill pore volume and other void space must be filled. The excess water remaining at the end of the hydration process drains back into the leachate collection system for either subsequent use or final disposal. After air injection has been completed, the system is chemically deprived of oxygen, allowing anaerobic decomposition to follow. The exit gas then contains methane.

These anaerobic conditions allow the sulfate salts to be reduced, producing small amounts of hydrogen sulfide. The hydrogen sulfide is responsible for at least two problems. First, the hydrogen sulfide must be removed from the extracted gas in order to minimize combustion engine deposits and/or corrosion, and sulfur containing exhaust gas emissions. Second, because hydrogen sulfide is noticeable even at trace levels, even small amounts seeping from the landfill cause odor problems.

Hydrogen sulfide removal from gas and liquid streams is a developed technology, generally involving metal ion catalysis. For more than thirty years, various inventors have patented hydrogen sulfide removal processes. See, for instance, Roberts U.S. Pat. No. 3,622,273, Mancini U.S. Pat. No. 4,011,304, Sibeud U.S. Pat. No. 4,036,942, Lampton U.S. Pat. No. 4,683,076, and Winchester U.S. Pat. No. 6,500,237. There are many others not cited. In general, these removal processes are designed to remove the hydrogen sulfide gas contained in a process stream, for instance, the gas stream exiting from a landfill and being delivered to the gas treatment plant for purification. These process schemes can remove the hydrogen sulfide in the gas streams, thereby reducing or eliminating corrosion problems and combustion exhaust gas emission problems.

Even though these hydrogen sulfide-containing gas streams may contribute to the general landfill odor; they are not responsible for the main sulfide odor problem. The main odor source is fugitive hydrogen sulfide, seeping at very low concentrations from the landfill via an array of pathways. The gas does not just escape from an opening in the landfill's surface. Rather, the concentration is very low but the gas is essentially everywhere. Since the cross sectional area of a landfill is very large, and the hydrogen sulfide concentration is very small, the problem does not lend itself easily to a simple and cost effective control process.

SUMMARY OF THE INVENTION

Aqueous foam can provide the application mechanism for maintaining moisture content throughout the loaf-like mass of trash. Unlike a conventional liquid, aqueous foams are thixotropic, meaning that they flow best under shear and, except for gravity, not at all when no shear force is present.

In landfill water addition as currently generally practiced, the fluid being added flows according to the path of least resistance, and since the mass of trash is non-uniform, all the fluid in the same general location flows along the same path, according to the same rules. Moisture addition to the overall mass of trash is limited to transport from the moving water stream, and has little if any effect on the material further than a few inches away from the water stream. The incoming water flows like a natural spring, collecting in larger volumes instead of dispersing throughout the mass.

By contrast, aqueous foam injected into the same region of the mass of trash will flow according to the applied shear forces. Consequently the larger, relatively open, zones will have smaller flows, while the tighter, smaller volume zones will have relatively more flow. This technique is widely practiced in foam-induced enhanced oil recovery (See for example, Schramm, L. L., editor, Foams: Fundamentals and Applications in the Petroleum Industry, Advances in Chemistry Series #242, American Chemical Society, Washington, D.C., 1994).

In accordance with this invention, aqueous foam is used as a water (moisture) transport medium for maintaining the moisture level within compacted trash in a closed landfill cell during the gas recovery process. Preferably, the aqueous foam can be produced from leachate from the landfill being treated.

The aqueous foam should exhibit a drain time (a measure of its rate of decomposition) of suitable duration to allow foam transport and moisture absorption by the compacted trash at an advantageous rate. If the decomposition time is too fast, moisture transport to some portions of the landfill will not occur and the liquid will simply exit the active zone as leachate.

The drain time of the injected foam should be related to the landfill injection pattern, so that all sections of the mass of trash will be contacted, wetted, and potentially converted into methane.

The aqueous foam can contain additives, nutrients, enzymes, and other biologically active materials, which can encourage the rate of production of methane, thereby producing a more time efficient process.

More particularly, in accordance with the invention, gas is recovered from a landfill by introducing water into the landfill, to promote digestion of organic matter in the landfill, and removing the gas produced by digestion from the landfill. The improvement comprises the introduction of water as part of aqueous foam, whereby the water is distributed more uniformly throughout the landfill.

Preferably, aqueous foam is injected into a closed landfill cell, and at least part of the water content of the aqueous foam reacts anaerobically with organic matter in the landfill cell to produce gas, primarily methane, which is removed from the landfill cell for use, either as pipeline gas or for combustion on site to produce energy.

The aqueous foam preferably has a sufficiently long drain time that it carries water to substantially all parts of the landfill cell, or at least to parts thereof that would not be reached by injected water if liquid (non-foamed) water were injected into the landfill cell through the same vertical injection system.

At least part of the water content of the aqueous foam may be derived from leachate from the landfill cell.

The aqueous foam is preferably injected into the landfill cell through a perforated borehole casing, and the aggregate cross-section of the perforations in the borehole casing is substantially equal to the cross-sectional area of the borehole casing.

The aqueous foam is preferably compressed gas foam produced by introducing a compressed gas into a liquid stream comprising water and surfactant, and the step of injecting aqueous foam is carried out by utilizing the pressure of the compressed gas to cause the foam to flow into the landfill cell. The compressed gas can be compressed air from a compressor, but to eliminate oxygen, the gas can be nitrogen obtained from a source of compressed nitrogen. Other non-oxygen containing gases could also be utilized as the foam expansion gas: carbon dioxide, methane, as well as conventional inert gases are examples.

In accordance with the invention, for effective odor reduction, hydrogen sulfide is controlled within the landfill mass prior to its escape into the environment. Control technology based on the currently practiced general metal ion catalysis can control hydrogen sulfide within the landfill mass via chemical elimination. When aqueous foam is formulated with metal ion salts, the hydrogen sulfide level in the produced gas is minimized.

A foam composition can deliver both the water required for hydration, and the metal ion catalyst used for hydrogen sulfide control, in a single application.

The aqueous foam can be formulated incorporating ferrous and/or ferric salts, for example by using ferrous ion stabilized hydrolyzed protein as the foaming agent instead of the more conventional synthetic surfactants. This foam delivery approach can also achieve the desired hydration but, in addition, the foam can add ferrous and ferric ion to the system as a mechanism of reducing or eliminating hydrogen sulfide.

These same process schemes can be adapted to the Hater process, by matching the foam compositions to the flow pattern, and to the time and distribution constraints.

The general process scheme of injecting foam into a landfill mass can be used for transporting other active ingredients besides water, ferrous/ferric salts, and biologically active additives. The foam concentrate can be formulated to include other chemical control agents, for instance, hydrogen sulfide controlling agents in addition to iron salts. Dispersants and/or surfactants can be included in the foam in order to improve gas and liquid flow properties within the landfill mass, especially where gas and liquid flow is potentially restricted or reduced by the presence of sediments or precipitates. Enzymes, nutrients, and other biologically active materials can also be included in the foam to promote the anaerobic reaction.

BRIEF DESCRIPTION OF THE DRAWINGS

FIG. 1 is a schematic diagram of a foam dilution and injection apparatus suitable for carrying out landfill gas recovery in accordance with the invention; and FIG. 2 is a schematic diagram of a landfill gas recovery system utilizing foam injection in accordance with the invention.

DETAILED DESCRIPTION OF THE INVENTION

The physical and chemical characteristics of the foam medium being used for water transport to the decomposing trash in the landfill cell are important. When considering only the issue of water transport, with no other additives included, the active ingredients in the composition must produce a foam with suitable stability to enable the foam to persist long enough to be transported throughout the mass of trash being hydrated.

Referring to FIG. 1, which depicts a foam system schematic for the in-line dilution configuration, three liquid tanks are shown. Tank 10 holds foam concentrate, tank 20 holds water or leachate, and tank 30 holds the biological and/or other additives. These tanks are equipped with suitable pumps, 11, 21, and 31, respectively, capable of generating the proper diluted composition in a flow line, 22, leading to a foam block 50 (see Kroll, U.S. Pat. No. 4,474,680, for example). The desired inlet pressure in foam block 50 is 200 to 400 psig. Therefore pump 21 should be a high capacity, high pressure pump. Low pressure outputs from pumps 11 and 31 feed the inlet of pump 21 through lines 12 and 32, respectively. The compressed gas, if air, comes from a source 40, which, in the case of air, can be a compressor, or, in the case of nitrogen or other expansion gas, for instance, a suitable pressurized source. The gas passes through line 41, entering the foam block 50. The gas pressure is not extremely high, and is suitably in the range from 80 to 120 psig. The foam block 50 mixes the dilute, to-be-foamed, liquid composition with the compressed gas, discharging the liquid and gas mixture through line 51, which leads to the injection well in the closed landfill cell.

In FIG. 2, the foam composition, coming from the generation system of FIG. 1, flows through line 51 into a main borehole injection pipe 55, which penetrates the surface of the landfill 70, and extends to a location near the bottom of the landfill mass 71, but above a leachate system 80. The foam is discharged into the landfill mass 71 from an array of perforations (not shown) in the main borehole casing, the discharge of foam being depicted by arrows 58. Gas produced within the landfill cell is collected by the gas collection system 60, and transferred to a main collection header 61, for delivery to a gas processing plant.

Consider the following idealized example, where the overall injection depth is 200 feet and the landfill cell is 100 feet in diameter, so that the radial distribution from the central injection point is 50 feet. The contact zone is a right circular cylinder filled with compacted trash and having an enclosed total volume of 1.57 million cubic feet. The trash has a porosity, or void volume, because gas can flow through the trash, and leachate can collect at the bottom of the cell. For sake of the example, assume the void volume is 20%, or 314,000 cubic feet.

In this example, 314,000 cubic feet of foam must be injected, and sufficient time must be allowed for the injected foam to flow throughout the cylindrical volume. Again, considering an ideal model, assume the injected foam exhibits an expansion ratio (volume of foam/volume of liquid used to produce the foam) of 20, therefore requiring 15,700 cubic feet of liquid, or 117,436 gallons of liquid, through the foaming process. It is worth noting that the expansion ratio-of the foam can be altered independently of other physical properties, thereby allowing some control over the amount of oxygen injected when using compressed air as the expansion gas.

Now, if the liquid flow rate used to make foam is 100 gallons per minute, the total injection operation will ideally take about 20 hours. Realistically in this ideal example, the foam should not drain significantly during the injection period. Therefore, the required drain time should be such that less than one percent drainage, approximately, occurs in the first 24 hours.

Foams exhibiting these drain time characteristics are known, and have been prepared using both commercial synthetic surfactants as well as ferrous/ferric iron containing hydrolyzed protein systems. The general technique for achieving extended drain time involves increasing the surface viscosity via post-foaming chemistry, protein systems, and/or adding various thickeners to the composition. Examples utilizing acrylic polymers are described in Rand U.S. Pat. No. 4,442,018, Hendrickson U.S. Pat. No. 4,836,939, and Kittle U.S. Pat. Nos. 4,874,641, 5,096,616, and 5,215,786. Examples utilizing protein systems with natural gums are described in DiMaio U.S. Pat. No. 5,225,095. Examples utilizing starches are described in Kittle U.S. Pat. No. 5,853,050. The disclosures of these patents are incorporated by reference.

Any of these general compositions can be used to achieve the hydration results desired, as the decision depends on cost, availability, ease of use, etc. The actual liquid foamed and injected into the landfill cell will contain a good foaming surfactant, generally anionic or protein based as described in the above-mentioned patents. The concentration of the foaming ingredient, i.e., the surfactant, will be in the range of 0.1 weight percent actives to 5.0 weight percent actives in the broadest practical conditions, and preferably between 0.3 and 0.8 weight percent actives in most applications.

The concentration of the viscosity-modifying agent in the foamable liquid will be in the range of 0.1 weight percent actives to about 4.0 weight percent actives, depending on the specific viscosity-modifying agent used, and the physical characteristics of the injection program. Smaller injection volumes will require less stringent drain time requirements, thereby reducing the magnitude of the viscosity modification, but not altering the surfactant level. In the case where modified starches or gums are the viscosity modifiers, the preferred concentration levels are between 0.3 weight percent actives and 0.7 weight percent actives. As the efficiency of the viscosity modifiers increases, the amounts required will decrease. For example, the class of viscosity modifiers known as associative thickeners, which are generally very efficient, will perform well in the range from 0.1 to 0.3 weight percent actives.

In practice, these diluted compositions will be prepared from a concentrate, delivered to the site for use. The composition of the concentrate is completely dependent on the amount of viscosity modifier required in the final, to-be-foamed, dilute liquid. In the case where the viscosity modifier is a modified starch or a natural gum, the maximum level in the concentrate will be 4.0 weight percent to 8.0 weight percent, with this concentrate being diluted with six to ten volumes of dilution water. The viscosity of these concentrates, in general, will be between 10000 cps and 50000 cps, as a function of the level of viscosity modifier. The surfactant level will be coordinated with the viscosity modifier, so that the final diluted material will have the proper composition. For example, if the viscosity modifier is 8.0 weight percent in the concentrate and diluted with nine volumes of water, the viscosity modifier in the dilute composition will be 0.8 weight percent. If the surfactant active level in the dilute composition is 0.4 weight percent, then in the concentrate composition the surfactant actives level needs to be 4.0 weight percent.

The dilution procedure is important, as there are two general procedures for generating to-be-foamed liquid. The dilution water can be either fresh water (pond, other surface water, or potable water) or leachate. The dilution procedure can be in-line dilution followed by immediate, direct foaming, or a pre-dilution step can be used where a larger volume of diluted material is prepared for eventual foam production. Since leachate in general will contain a significant level of minerals and other possible impurities, this dilution liquid is best used in the in-line configuration, thereby allowing the foaming to occur before the minerals or impurities have an opportunity to interact with the foaming surfactant or the viscosity modifiers. When other water is used for dilution, the pre-dilution scheme can be used, although mineral content, specifically hardness, should be evaluated with respect to the actual performance requirements.

The foam production procedure can be the same regardless of the dilution scheme utilized. The foam is preferably produced using compressed air, or, more preferably nitrogen, since minimization of oxygen is desirable. Foams prepared in this manner are referred to as compressed gas foams, or pneumatic foams. The other standard foam-making procedure utilizes a technique called air aspiration, similar to the foam-making procedures used on fire trucks. Since the landfill foam must be injected under modest pressure, compressed gas, or pneumatic, foam production will perform correctly, and is preferred over air aspiration.

Pneumatic foam production is carried out by adding the compressed stream to the dilute, to-be-foamed, liquid stream, followed by a suitable amount of mixing, thereby yielding foam which can be delivered, pneumatically, to the application location. This technology is described in the previously cited Kittle U.S. Pat. No. 4,874,641 and Kroll U.S. Pat. No. 4,474,680.

Injecting the foam into the closed landfill cell requires attaching the foam discharge hose to a perforated casing lining a borehole drilled into the closed landfill cell. There are many combinations of liquid flows, foam flows, discharge line sizes, and borehole casing sizes, which will balance properly, but only one case will be described. Persons skilled in the art can readily convert the following example to other size ranges.

Using the idealized example above, of 100 gallons per minute liquid flow, the system can be generally sized as follows. If the foam generated in-this system exhibits an expansion ratio between 15 and 20, the foam discharge hose diameter will be a 4 inch minimum to 6 inch maximum, depending upon the foam transport distance. The casing in the landfill cell borehole should be 6 inch minimum and 8 inch to 10 inch maximum, depending on foam transport depth and pressure drop in the landfill mass. These characteristics will tend to be landfill specific with adjustments and modifications on a case-by-case basis.

The borehole casing serves several functions, mostly mechanical, but it is also a foam distribution manifold. Two general rules-of-thumb for foam manifolds are: (1) the cross-sectional area of the inlet should approximately equal the cross-sectional area of the outlet; and, (2) the exit ports need to be large enough to minimize foam shearing and destruction (see Kittle U.S. Pat. No. 5,011,330, for example, which is incorporated by reference). Therefore, assume for the example, that the discharge hose is 6 inches in diameter, or 28.3 square inches in cross-section. If the discharge holes are 0.5 inch in diameter, i.e., 0.20 square inches in cross section, which is a reasonable size, then, for equivalency, the total number of holes is approximately 144. Since the foam distribution needs to be radially uniform, assume the radial distribution of discharge ports is 60 degrees, and that these radial holes are separated by three vertical feet. Therefore the distance between the uppermost six radial discharge holes and lowermost six radial discharge holes is 69 feet, or a 144 discharge hole-pattern is repeated every 72 feet.

These calculations indicate that several injection procedures can be considered. Using the 72 foot manifold distance as a reference, one could consider discharge zones in approximate 75 foot increments: top 75 feet, middle 75 feet, lower 75 feet, etc., as a function of the cell depth. At least three procedures can be used for implementing this injection plan. At each injection location separate boreholes may be drilled and cased with perforated casing appropriate to the injection depth. Alternatively foam can be injected initially only at the upper zone, allowing draining liquid to moisten the lower levels. Then, as methane production declines, the injection point can be lowered. A further alternative is to use a borehole casing which is perforated over its entire length, and insert a non-perforated sleeve to blind the perforation zones not being used for foam injection.

Foaming and injection and recovery configurations differing from those shown in FIGS. 1 and 2 can be used. For example, foam can be injected through several boreholes, either simultaneously or sequentially, especially in the case of a landfill cell having a large horizontal cross-section The benefits of the invention can be estimated using the example outlined above. In the example, the treatment zone volume is 1.57 million cubic feet, or 58,148 cubic yards, and the in-place compacted trash density can be assumed to be one ton per cubic yard. Therefore, the compacted trash in the closed cell weighs 58,148 tons. The assumed moisture content is 15 weight percent water average, or 8722 tons of water, leaving 49,426 tons of solid trash. The solid trash may be 33% non-biodegradable, e.g., glass, tires, metal, etc., leaving 33,115 tons of potential methane-producing material. If we overlook the original water and the oxygen scavenging for simplicity, after theoretically complete anaerobic decomposition, the methane recovered will total 25,230 tons or 1.13 billion cubic feet (STP). In addition, the cell volume will have been decreased from 58,148 cubic yards to 19,200 cubic yards, assuming constant density, thereby regenerating 38,948 cubic yards of landfill airspace before any landfill mining.

As mentioned previously, the foam preferably includes an iron salt. The iron salt, for example ferrous chloride or ferrous sulfate, may be incorporated in a hydrolyzed protein foam as a stabilizer. The iron salt should be present in a sufficient quantity to reduce the amount of hydrogen sulfide gas produced by reduction of the sulfates under anaerobic conditions in the landfill. Preferably, the foam includes a sufficient quantity of iron salt to substantially eliminate emission of olfactorily detectable quantities of hydrogen sulfide gas.

Examples of suitable iron-based hydrogen sulfide control agents include ferric or ferrous ions coordinated with an anionic ligand, which is usually a polyaminocarboxylic acid, like hydrolyzed protein foam components, ehtylenediamintetraacetic acid (EDTA), hydroxyethylethylenediaminetetraacetic acid (HEDTA), diethylenetriaminepentaacetic acid (DTPA), or nitrilotriacetic acid (See Demmink, Mehra and Beenackers, "Absorption of Hydrogen Sulfide into Aqueous Solutions of Ferric Nitrilotriacetic Acid: Local Auto-Catalytic Effects," Chemical Engineering Science, Volume 57, pages 1723–1734 (2002), and a thorough review of the subject, McManus and Martell, "The Evolution, Chemistry and Applications of Chelated Iron Hydrogen Sulfide Removal and Oxidation Processes," J. Molecular Catalysis A: Chemical, Volume 117, pages 289–297). Preferably, the systems need to be soluble and with suitable iron salt concentration and also composed into a formulation which can be foamed. Other hydrogen sulfide control agents such as nitrogen bases (amines) can also be used, and the same rules apply. The amount of control agent needed, of course, depends on the amount of sulfide-producing material in the landfill. If the landfill contains large amounts of gypsum wallboard for example, larger amounts of hydrogen sulfide control agent may be needed. However, in general, since excess hydrogen sulfide control agent does no harm, generally, and iron-based materials are inexpensive, in the case of ferrous ion coordinated with protein anions in the liquid from which the foam is generated will provide effective elimination of olfactorily detectable hydrogen sulfide emissions in most landfills.

EXAMPLE ONE
Foam Concentrate for Landfill Moisture Addition

Room temperature water, 25800 grams (56.88 pounds) was placed in a suitable stirred vessel. Potassium tripolyphosphate (FMC Corporation, Philadelphia, Pa.), 300 grams (0.66 pounds) was added and dissolved with stirring. Next, AS-40 α-olefin sulfonate (40 wt % actives, Stepan Company, Northfield, Ill.), 1500 grams (3.31 pounds) was added and stirred for a few minutes to complete the mixing. Acrysol ICS-1 (30 wt % actives, Rohm and Haas Company, Philadelphia, Pa.), 2000 grams (4.41 pounds) was added to the vessel and stirred until homogeneous. The solution was now ready for viscosity increase via the addition of base, thereby raising the pH. Various bases can be used, including sodium, potassium, and ammonium hydroxide, as well as simple amines, like triethanolamine or diethanolamine, or combinations of the two. When triethanolamine (Dow Chemical Company, Midland, Mich.) is used, approximately 400 grams (0.88 pounds) is added very slowly with strong stirring thereby allowing the pH and viscosity to increase. After thorough stirring, the homogeneous, generally clear, solution exhibited a minimum pH of 8.5 and a viscosity in the range of 4000+ centipoise. This concentrate contains approximately 20000 ppm (2.0 wt %) of α-olefin sulfonate actives thereby suggesting a maximum dilution for foaming of 10, meaning that one part of concentrate can be added to nine parts of dilution water, providing to-be-foamed liquid with α-olefin sulfonate actives at 2000 ppm (0.2 wt %) Under these circumstances the thickener (Acrysol ICS-1) actives concentration has been reduced from 20000 ppm (2.0 wt %) in the concentrate to 2000 ppm (0.2 wt %) in the diluted to-be-foamed liquid. Various factors need to be considered when preparing compositions like this for actual foaming. These include the previously mentioned injection pattern on the landfill as well as the dilution procedure, in-line or predilute, and the dilution water source, surface water or possibly leachate. Increasing the surfactant concentration in the diluted to-be-foamed liquid will allow poorer quality dilution water to be used, while increasing the thickener concentration in the diluted to-be-foamed liquid will provide longer drain times, or more foam stability. Those skilled in the art can adjust the base concentrated formulation and/or the dilution ratio to achieve the proper final to-be-foamed liquid composition. Foaming of the final diluted liquid composition can be accomplished via techniques described by Kittle U.S. Pat. No. 4,874,641 and Kroll, U.S. Pat. No. 4,474,680.

EXAMPLE TWO
Foam Concentrate for Landfill Moisture Addition and $H_2S$ Control

Similar to the previous example composition, this multiple use formulation needs to also have the $H_2S$ control component optimized/adjusted for the operating conditions. However, an advantage of the hydrolyzed protein systems is that they have much greater tolerance with respect to dilution water composition than the more conventional anionic systems, thereby allowing easier incorporation of leachate as the dilution medium. In a similar manner, the hydrolyzed protein system needs a foaming component, the dry hydrolyzed protein (100 wt % actives, Industria Suma, Brazil), a viscosity modifier, modified starch (100 wt % actives, Cargill Cerestar, Bedrijvenlaan, Belgium or National Starch, Bridgewater, N.J.) to adjust the drain time performance, and a ferrous ion component to stabilize the protein but also provide hydrogen sulfide destruction capability. As in the case with anionic systems, the overall formulation is controlled by the viscosity modifier as that component defines the viscosity of the concentrate and therefore the physical properties. The dry hydrolyzed protein component can vary from about 3 wt % to 5 wt % when the dilution involves approximately five to ten equal volumes of water. If modified starch is utilized as the viscosity modifier, the maximum amount for very long drain time performance is approximately an equal weight percent to that of the hydrolyzed protein. In order to achieve a high concentration formulation the viscosity modifier can be reduced to 33–50% of the weight percent of the hydrolyzed protein and still deliver a suitable drainage rate. For simple primary hydration applications the ferrous sulfate can be equal to a minimum of about 25% of the hydrolyzed protein weight percent, while the maximum ferrous sulfate level is about twice the hydrolyzed protein weight percent. Other ingredients can be added to the formulation for stability and process control. These materials include dispersants, often lignonsulfonates, (Lignotech USA, Greenwich, Conn.), which can be increased or decreased in order to optimize dispersing properties, small amounts of foam boosters, like diethyleneglycol monobutylether (Dow Chemical Company, Midland, Mich.), ammonium hydroxide for pH control and probably a biocide (Rohm and Haas, Philadelphia, Pa., or Nipa Hardwick, Wilmington, Del.) to control bacterial growth. A procedure for producing an 11340 kilograms (25000 pounds) batch of hydrolyzed protein concentrate starts with 9136 kilograms (20140 pounds) warm water into which the foam booster, diethyleneglycol monobutylether, 85 kilograms (188 pounds) and then the modified starch, Cerestar Instant Gelex, 567 kilograms (1250 pounds) are added. Very good mixing is required since the final viscosity is high. When that addition and mixing has been completed the dry hydrolyzed protein from Suma, 363 kilograms (800 pounds) can be added, followed by the dispersant, Norlig TSFL-4 (Lignotech), 454 kilograms (1000 pounds) and finally the ferrous salt, ferrous sulfate, 680 kilograms (1500 pounds). Ammonium hydroxide, approximately 34 kilograms (75 pounds), can adjust the pH to about 7.0 followed by sufficient stirring to generate a homogeneous mixture. A biocide can be added if desired, 23 kilograms (50 pounds) in order to minimize bacteria growth. The final pH of this formulation is between 6.5–7.0 at room temperature. The final viscosity is between 25000 and 30000 centipoise at room temperature.

EXAMPLE THREE
Foam Concentrate for Moisture and Dispersant Addition

A foaming concentrate with added dispersing properties can be formulated in many different ways, but a simple example including both soap-based dispersants (stearate salts) and polymer-based dispersants (polyacrylate salts) along with the foaming surfactant can be a variation of Example One, above. In a suitably sized vessel, place 7007 kilograms (15449 pounds) of water and heat to about 55–60° C. Add 163 kilograms (360 pounds) of potassium tripolyphosphate (FMC Corporation, Philadelphia, Pa.) and stir to dissolve. Follow this with the addition of 572 kilograms (1262 pounds) of triethanolamine (Dow Chemical, Midland, Mich.) and 1633 kilograms (3600 pounds) of AS-40 α-olefin sulfonate (Stepan Company, Northfield, Ill.). Stearic acid, Hystrene 5016 (Witco Chemical, Greenwich, Conn.), 542 kilograms (1195 pounds) can be added slowly with stirring, allowing melting and dissolution. When this operation has been completed 968 kilograms (2134 pounds) of AR-7H (Alco Chemical, Chattanooga, Tenn.) can be added and neutralized with the triethanolamine. This formulation produces about 10886 kilograms (24000 pounds) of finished product which can generally be foamed well when diluted one part composition and 6.5 parts dilution water.

Any of the above diluted compositions can be converted to foam using the generalized procedures outlined in Kittle U.S. Pat. No. 4,874,641 and Kroll, U.S. Pat. No. 4,474,680. When the injection pattern is defined, the void volume estimated and the to-be-foamed liquid flow rate determined, the first approximation for total injection time can be estimated, as outlined above. Since the physical characteristics, other than drain time, of the foam are not crucial for this application, the injection manifold does not require as much design input as, for instance, surface application (see, for instance, Kittle, U.S. Pat. No. 5,011,330 for issues of manifold design for surface applications). The discharge of the pneumatic foam machine is connected to the perforated borehole casing, and the foam injection is started. The foam must displace the air in the borehole and start penetrating the landfill mass through the perforations. Since the landfill mass characteristics will vary from location to location even within the same landfill cell, care must be exercised that the pressure in the discharge location does not overwhelm the compressed air, or gas, injection pressure. If that happens then the air flow will be reduced and the foam characteristic will be altered negatively. This can be monitored via pressure readings at the foam machine or the borehole entry point, or both, depending upon the arrangement of the equipment and discharge location. It may be necessary to stage the injection allowing some pressure increase, followed by no injection while the pressure declines, adding more foam, stopping, etc. Clearly, if the foam flow is too great compared to the acceptance rate of the landfill cell, then an alternative is to reduce the flow rate. Since the injection depth in a landfill is modest compared to oil well drilling, the operation also needs to be observant for surface rupture where the foam has forced a breach in the final cover of a closed cell. Other common leakages should also be considered. When the desired quantity of liquid has been foamed and discharged, the pressure in the system can be allowed to dissipate, then the feed lines can be disconnected and the borehole capped. This can be accomplished via a borehole capping arrangement which allows the pressure in the delivery lines to be vented while maintaining modest pressure in the borehole itself. Many combinations of common plumbing fittings can be assembled to achieve a safe depressurization scheme. The discharge plumbing can then be attached to the next borehole and the injection sequence continued.

I claim:

1. A process for recovering gas from a landfill comprising introducing water into the landfill, to promote digestion of organic matter in said landfill, and removing from the landfill gas produced by said digestion, wherein the improvement comprises the introduction of said water as part of an aqueous foam, whereby the water is distributed more uniformly throughout the landfill.

2. A process according to claim 1, in which said foam includes an iron salt.

3. A process according to claim 1 in which said landfill includes a quantity of sulfates, and in which said foam includes a sufficient quantity of iron salt to reduce the amount of hydrogen sulfide gas produced by reduction of said sulfates under anaerobic conditions in said landfill.

4. A process according to claim 1 in which said landfill includes a quantity of sulfates, and in which said foam includes a sufficient quantity of iron salt to substantially eliminate emission of olfactorily detectable quantities of hydrogen sulfide gas produced by reduction of said sulfates under anaerobic conditions in said landfill.

5. A process for recovering gas from an enclosed landfill cell comprising injecting aqueous foam into the landfill cell, anaerobically reacting at least part of the water content of the aqueous foam with organic matter-in the landfill cell to produce gas, and removing said produced gas from the landfill cell for use.

6. The process of claim 5, wherein said aqueous foam is injected through an injection system, and has a sufficiently long drain time that the foam carries water to parts of the landfill cell that would not be reached by injected water if unfoamed water were injected into the landfill cell through the same injection system.

7. The process of claim 5, wherein said aqueous foam is injected through an injection system, and has a sufficiently long drain time that the foam carries water to substantially all parts of the landfill cell.

8. The process of claim 5, wherein at least part of the water content of said aqueous foam is derived from leachate from said landfill cell.

9. The process of claim 5, wherein said aqueous foam is compressed gas foam.

10. The process of claim 5, wherein said aqueous foam is a compressed gas foam produced by introducing a compressed gas into a liquid stream comprising water and surfactant.

11. The process of claim 5, wherein said aqueous foam is a compressed gas foam produced by introducing a compressed gas into a liquid stream comprising water and surfactant, and the step of injecting aqueous foam is carried out by utilizing the pressure of said compressed gas to cause the foam to flow into the landfill cell.

12. The process of claim 5, wherein said aqueous foam is injected into the landfill cell through a perforated borehole casing.

13. The process of claim 5, wherein said aqueous foam is injected into the landfill cell through a perforated borehole casing, and wherein the aggregate cross-section of the perforations in the borehole casing is substantially equal to the cross-sectional area of the borehole casing.

14. The process of claim 5, wherein said aqueous foam is a compressed gas foam produced by introducing nitrogen, from a tank of compressed nitrogen, into a liquid stream comprising water and surfactant.

15. The process of claim 5, wherein said aqueous foam contains a biologically active material for promoting the anaerobic reaction of the water content of the foam with organic matter in the landfill cell.

16. The process of claim 5, wherein said aqueous foam is a compressed gas foam produced by introducing a compressed gas into a liquid stream comprising water, surfactant, and a biologically active material for promoting the anaerobic reaction of the water content of the foam with organic matter in the landfill cell, and wherein the step of injecting aqueous foam is carried out by utilizing the pressure of said compressed gas to cause the foam to flow into the landfill cell.

17. A process according to claim 5, in which said foam includes an iron salt.

18. A process according to claim 5 in which said landfill cell includes a quantity of sulfates, and in which said foam includes a sufficient quantity of iron salt to reduce the amount of hydrogen sulfide gas produced by reduction of said sulfates under anaerobic conditions in said landfill cell.

19. A process according to claim 5 in which said landfill cell includes a quantity of sulfates, and in which said foam includes a sufficient quantity of iron salt to substantially eliminate emission of olfactorily detectible quantities of hydrogen sulfide gas produced by reduction of said sulfates under anaerobic conditions in said landfill cell.

* * * * *